US011356716B2

(12) United States Patent
Jimenez et al.

(10) Patent No.: US 11,356,716 B2
(45) **Date of Patent: *Jun. 7, 2022**

(54) SYSTEM FOR INSERTING SUPPLEMENTAL CONTENT WITHIN A MEDIA STREAM

(71) Applicant: Verizon Patent and Licensing Inc., Basking Ridge, NJ (US)

(72) Inventors: Eduardo Jimenez, Santa Clara, CA (US); Rodrigo Meneses, Santa Clara, CA (US); Mahesh Kumar Vasanthusomashekar, Newark, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/948,511

(22) Filed: Sep. 22, 2020

(65) Prior Publication Data

US 2021/0014542 A1 Jan. 14, 2021

Related U.S. Application Data

(63) Continuation of application No. 15/885,384, filed on Jan. 31, 2018, now Pat. No. 10,798,429.

(51) Int. Cl.
*H04N 21/234* (2011.01)
*H04N 21/239* (2011.01)
(Continued)

(52) U.S. Cl.
CPC ..... *H04N 21/23424* (2013.01); *H04N 21/235* (2013.01); *H04N 21/2393* (2013.01);
(Continued)

(58) Field of Classification Search
CPC ......... H04N 21/23424; H04N 21/2393; H04N 21/25841; H04N 21/4402; H04N 21/4722; H04N 21/812
See application file for complete search history.

(56) References Cited

U.S. PATENT DOCUMENTS

2002/0184047 A1* 12/2002 Plotnick .................. H04N 5/76 705/1.1
2011/0302600 A1 12/2011 Kelsen et al.
(Continued)

*Primary Examiner* — Chenea Davis

(57) ABSTRACT

An example includes receiving a request for supplemental content; determining a type of supplemental content insertion to be performed to insert the supplemental content within the media stream; identifying a break of the media stream based on a characteristic of the media stream and the type of supplemental content insertion; determining location information identifying a location associated with a media client accessing the media stream; identifying the supplemental content for the break based on the location associated with the media client; generating an instruction file associated with the type of supplemental content insertion and the supplemental content, where the instruction file is to include supplemental content information for inserting the supplemental content in the break of the media stream; and sending the instruction file to the media client to enable the media client to access the supplemental content that is to be inserted within the media stream.

20 Claims, 5 Drawing Sheets

(51) Int. Cl.

| | |
|---|---|
| ***H04N 21/4402*** | (2011.01) |
| ***H04N 21/258*** | (2011.01) |
| ***H04N 21/4722*** | (2011.01) |
| ***H04N 21/81*** | (2011.01) |
| ***H04N 21/235*** | (2011.01) |
| ***H04N 21/262*** | (2011.01) |
| ***H04N 21/2668*** | (2011.01) |
| ***H04N 21/462*** | (2011.01) |
| ***H04N 21/45*** | (2011.01) |
| ***H04N 21/44*** | (2011.01) |

(52) U.S. Cl.

CPC ... *H04N 21/25841* (2013.01); *H04N 21/2668* (2013.01); *H04N 21/26258* (2013.01); *H04N 21/4402* (2013.01); *H04N 21/44016* (2013.01); *H04N 21/4524* (2013.01); *H04N 21/4622* (2013.01); *H04N 21/4722* (2013.01); *H04N 21/812* (2013.01)

(56) References Cited

U.S. PATENT DOCUMENTS

2013/0103785 A1 4/2013 Lyon
2015/0019629 A1* 1/2015 Giladi .............. H04N 21/26258 709/203
2015/0319479 A1* 11/2015 Mishra ............... G06Q 30/0257 725/32

* cited by examiner

SYSTEM FOR INSERTING SUPPLEMENTAL CONTENT WITHIN A MEDIA STREAM

RELATED APPLICATION

This application is a continuation of U.S. patent application Ser. No. 15/885,384 (now U.S. Pat. No. 10,798,429), entitled "SYSTEM FOR INSERTING SUPPLEMENTAL CONTENT WITHIN A MEDIA STREAM," filed Jan. 31, 2018, which is incorporated herein by reference.

BACKGROUND

Streaming media (e.g., video streaming) involves delivering content and continually presenting the content to an end-user. A media stream can include a live stream, a look-up stream, and/or the like. In a live stream, content is provided to a destination device without saving the content (e.g., using memory resources). In a look-up stream, content can be saved and/or buffered (e.g., temporarily stored) in a look-up storage prior to being provided to a destination device.

DETAILED DESCRIPTION OF PREFERRED EMBODIMENTS

Figure 1A:
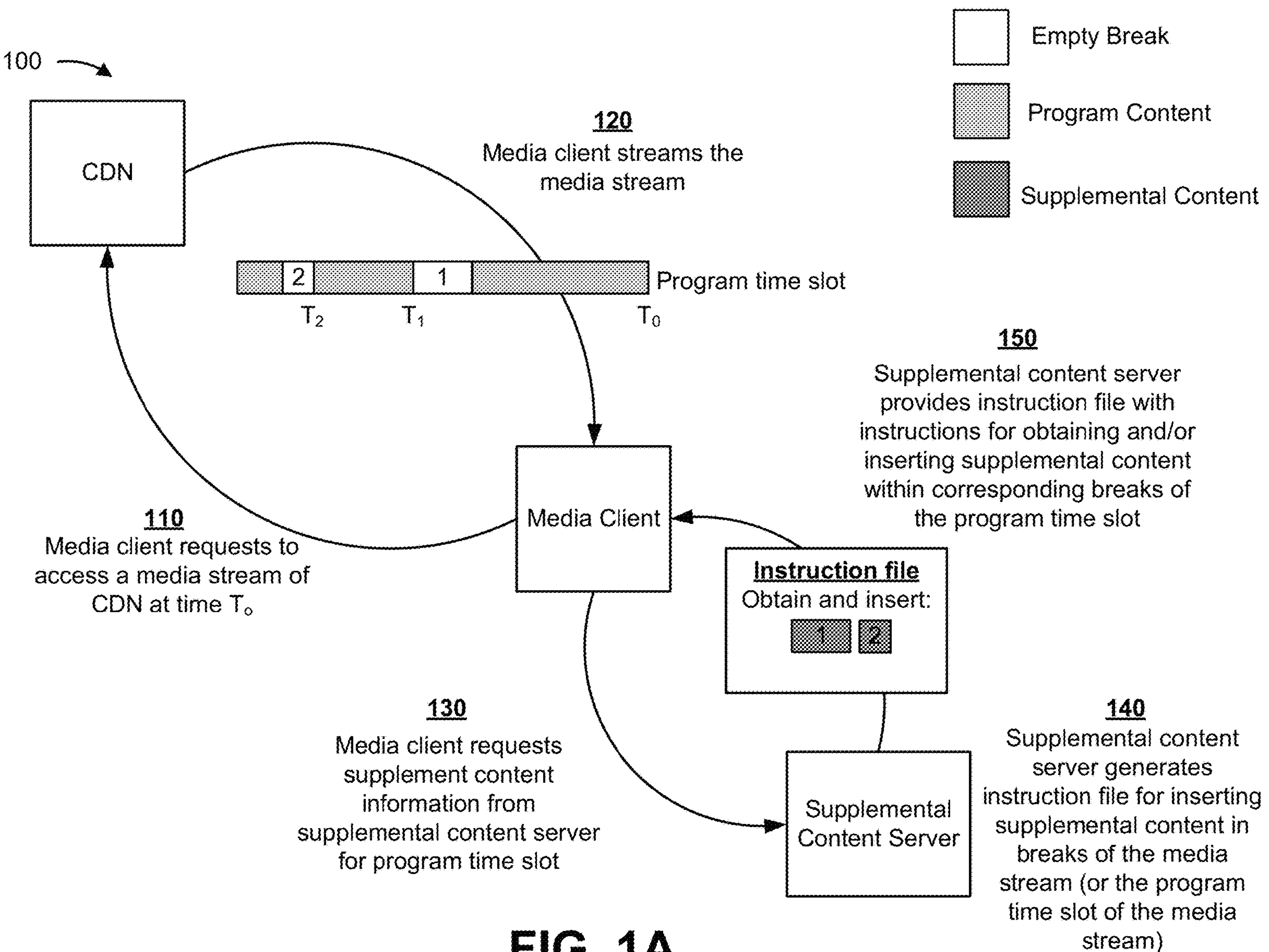
FIGS. 1A and 1B are diagrams of an overview of an example implementation described herein.

The following detailed description of example implementations refers to the accompanying drawings. The same reference numbers in different drawings can identify the same or similar elements.

In many instances, a supplemental content server provides supplemental content (e.g., metadata, display content associated with the media stream, advertising content, and/or the like) to one or more media clients that are accessing a media stream (e.g., streaming media). For example, while accessing a media stream (e.g., receiving the media stream, opening the media stream, presenting content of the media stream, and/or the like), a media client can request (e.g., based on detecting a supplemental content cueing message (e.g., a society of cable and telecommunication engineers (SCTE) 35 (SCTE35) message in the media stream)) a supplemental content server to provide supplemental content for insertion within a media stream. In such cases, based on receiving a request for supplemental content, the supplemental content server can provide (e.g., stream, transmit, and/or the like) the supplemental content to the media client. In many instances, with multiple media clients (e.g., thousands or millions) accessing a same media stream, the supplemental content server can overload a network and/or be overloaded with providing multiple streams or instances of supplemental content for breaks.

According to some implementations described herein, a supplemental content server and/or a media client can utilize video multiple advertisement playlist (VMAP) information and/or video advertisement serving template (VAST) information for advertisement insertion (which can be referred to herein as "supplemental content insertion") when accessing a media stream. Supplemental content insertion includes inserting supplemental content within a media stream. For example, as described herein, based on receiving a request for supplemental content from a media client for a break of a media stream, a supplemental content server can generate an instruction file that includes VMAP information and/or VAST information (e.g., via an extensible markup language (XML) file) that the media client can use to obtain and insert the supplemental content within the break of the media stream. Accordingly, the media client, using the instructions with the VMAP information and/or the VAST information, can obtain appropriate supplemental content for a break from a device other than the supplemental content server. The example device, which can be referred to herein as an "supplemental content source," can include any data structure or data store that stores and/or streams supplemental content. In some implementations, the supplemental content source can be located nearer the media client than the supplemental content server. Accordingly, because a supplemental content server can provide instructions for supplemental content insertion rather than actual supplemental content (which can include a greater amount of data and the instructions), some implementations described herein can conserve resources of both the supplemental content server and a network associated with the supplemental content server. More specifically, because the supplemental content server can send an instruction file to obtain and insert supplemental content, rather than the supplemental content itself, network resources can be freed up within portions of a network near the supplemental content server.

Figure 1B:
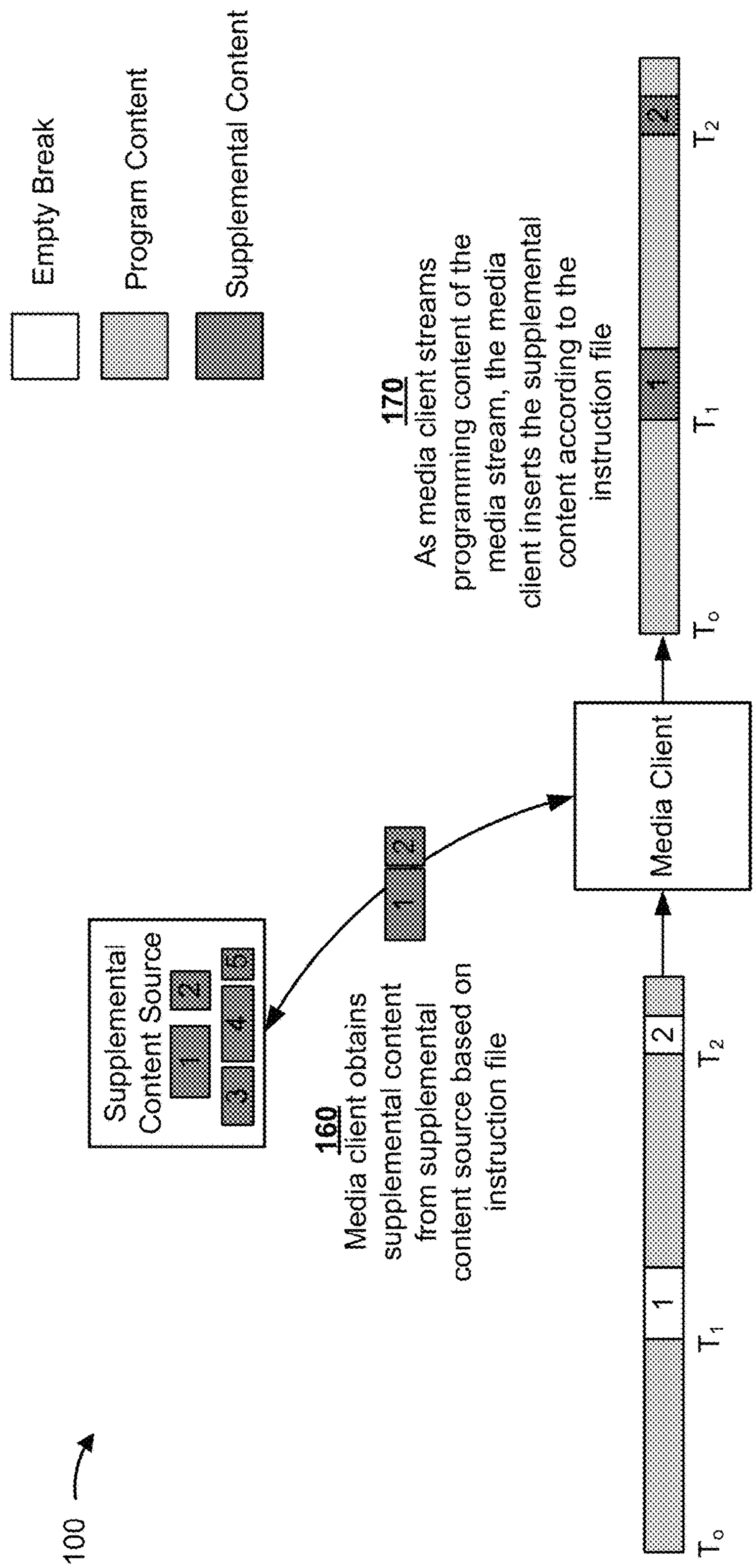

FIGS. 1A and 1B are diagrams of an overview of an example implementation 100 described herein. In FIGS. 1A and 1B, a media client accesses a media stream and inserts supplemental content within the media stream according to some implementations described herein.

As shown in FIG. 1A, and by reference number 110, the media client requests to access a media stream of a content delivery network (CDN) (e.g., a streaming service and/or streaming network) at time $T_0$. As shown by reference number 120, the media client streams the media stream. For example, as shown, the media client can stream program content from the CDN from time $T_0$ toward time $T_2$ or the end of the program time slot. As shown within the program time slot, there are two breaks (indicated as "1" and "2"), within which supplemental content is to be inserted by the media client when accessing the media stream.

As shown by reference number 130 of FIG. 1A, the media client requests (or sends a request for) supplemental content to the supplemental content server. Accordingly, as shown by reference number 140, the supplemental content server generates an instruction file (e.g., an XML file) for inserting supplemental content in one or more breaks of the media stream (e.g., within remaining breaks of the program time slot). In some implementations, the supplemental content server generates the instruction file based on one or more characteristics or information provided in a request for supplemental content from the media client. For example, the request can include one or more of information associated with a program of the media stream, an identifier of the media stream, a location of the media client, a type of supplemental content insertion performed by the media client, and/or the like. Some examples of types of supplemental content insertion include unicast supplemental content insertion, multicast supplemental content insertion, pre-fetch supplemental content insertion (where supplemental content for all breaks of a particular time period are obtained before detection of a supplemental content insertion message (or cueing message)), look-up supplemental content insertion, and/or the like. In some implementations, the request for supplemental content information can correspond to an upcoming break (e.g., for unicast), or any remaining breaks of a particular time period (e.g., a current and/or future program time slot of the media stream) indicated in the request from media client (e.g., for pre-fetch supplemental content insertion and/or VOD supplemental content insertion). As further shown in FIG. 1A, and by reference number 150, the supplemental content server provides the instruction file with instructions (e.g. which can include the VMAP information and/or the VAST information) for obtaining and/or inserting supplemental content within corresponding breaks of the program time slot. For example, the VMAP information and/or the VAST information can indicate a source for supplemental content to be included in the break, a sequence order for supplemental content to be included in the break, a length of the supplemental content to be included in the break, and/or the like.

As shown by FIG. 1B, and by reference number 160, the media client obtains supplemental content from a supplemental content source based on the instructions of the instruction file. For example, as shown the media client obtains supplemental content 1 and 2 from the supplemental content source. As further shown in FIG. 1B, and by reference number 170, as the media client streams the program content of the media stream, the media client inserts the supplemental content according to the instructions (e.g., as indicated by the VMAP information and the VAST information) of the instruction file. It is noted, that the supplemental content of supplemental content 1 and supplemental content 2 can include multiple sets of supplemental content.

Accordingly, as described in connection with example implementation 100, a supplemental content server can provide an instruction file that includes the VMAP information and/or the VAST information to enable a media client to access (e.g., download or stream) supplemental content directly from a supplemental content source. As such, the supplemental content server can conserve computing resources and/or network resources, as the supplemental content server can not necessarily provide the supplemental content and enables the media client to access the supplemental content from a supplemental content source that can be closer (e.g. physically and/or logically within a network) to the media client than the supplemental content server.

As indicated above, FIGS. 1A and 1B are provided merely as an example. Other examples are possible and can differ from what was described with regard to FIGS. 1A and 1B.

Figure 2:
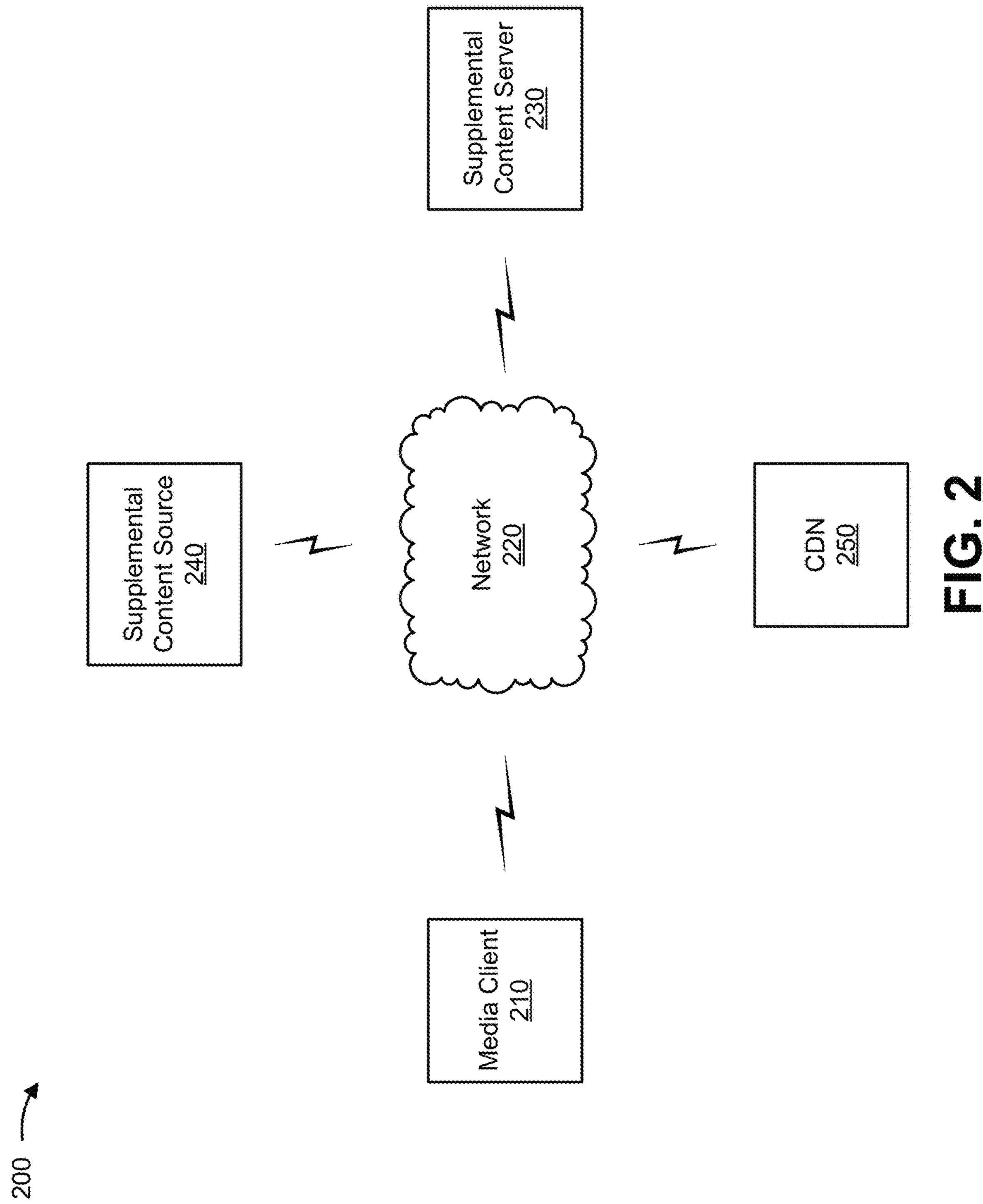
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a media client 210, network 220, supplemental content server 230, one or more supplemental content sources 240 (which can be referred to individually as “supplemental content source 240” and collectively as “supplemental content sources 240”), and CDN 250. Devices of environment 200 can interconnect via wired connections, wireless connections, or a combination of wired and wireless connections.

Media client 210 includes a device capable of receiving, transmitting, and/or processing multimedia content and providing the multimedia content to a user (e.g., via a display device). Examples of media client 210 can include a smartphone, a set-top box, a casting stick (e.g., a high-definition media interface (HDMI) dongle), a computer, a tablet, a cable card, a gaming device, a portable electronic device, and/or other types of devices capable of receiving, transmitting, and/or processing multimedia content and providing the multimedia content to a user. According to some implementations, media client 210 can obtain (e.g., download, stream, and/or the like) supplemental content based on instructions (e.g., which can include VMAP and/or VAST information) received from supplemental content server 230.

Network 220 includes one or more wired and/or wireless networks. For example, network 220 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Supplemental content server 230 includes one or more devices capable of storing, processing, and/or routing information associated with supplemental content. In some implementations, supplemental content server 230 can include a communication interface that allows supplemental content server 230 to receive information from and/or transmit information to other devices in environment 200. For example, supplemental content server 230 can receive requests via network 220 for supplemental content and/or supplemental content information (e.g., from media client 210) and/or can provide supplemental content and/or supplemental content information via network 220 (e.g., to media client 210). According to some implementations, supplemental content server 230 can generate instructions (e.g., via an instruction file, such as an XML file) for media client 210 to obtain and/or insert supplemental content within a media stream.

Supplemental content source 240 includes one or more devices capable of storing, processing, and/or providing supplemental content. In some implementations, supplemental content source 240 can include a communication interface that allows supplemental content source 240 to receive information from and/or transmit information to other devices in environment 200. For example, supplemental content server 230 can receive requests, via network 220 for supplemental content (e.g., from media client 210) and/or con provide supplemental content via network 220 (e.g., to media client 210).

CDN 250 includes one or more server devices (e.g., content servers) or one or more groups of server devices within one or more wired and/or wireless networks. For example, CDN 250 can include a content delivery network, a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In some implementations, CDN 250 can provide program content to media client 210.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
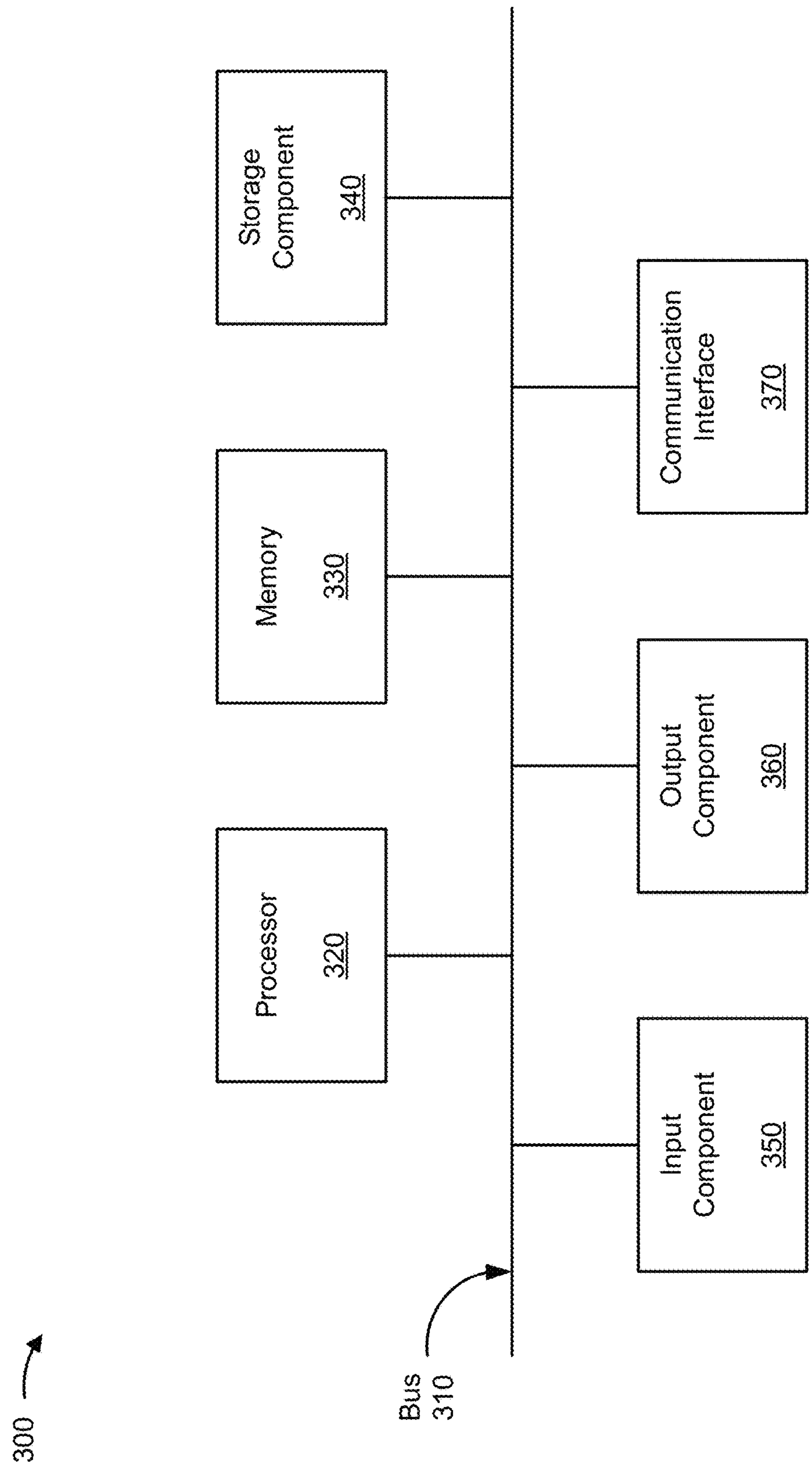
FIG. 3 is a diagram of example components of one or more devices of FIG. 2.

FIG. 3 is a diagram of example components of a device 300. Device 300 can correspond media client 210, supplemental content server 230, supplemental content source 240, and/or CDN 250. In some implementations, media client 210, supplemental content server 230, and/or CDN 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
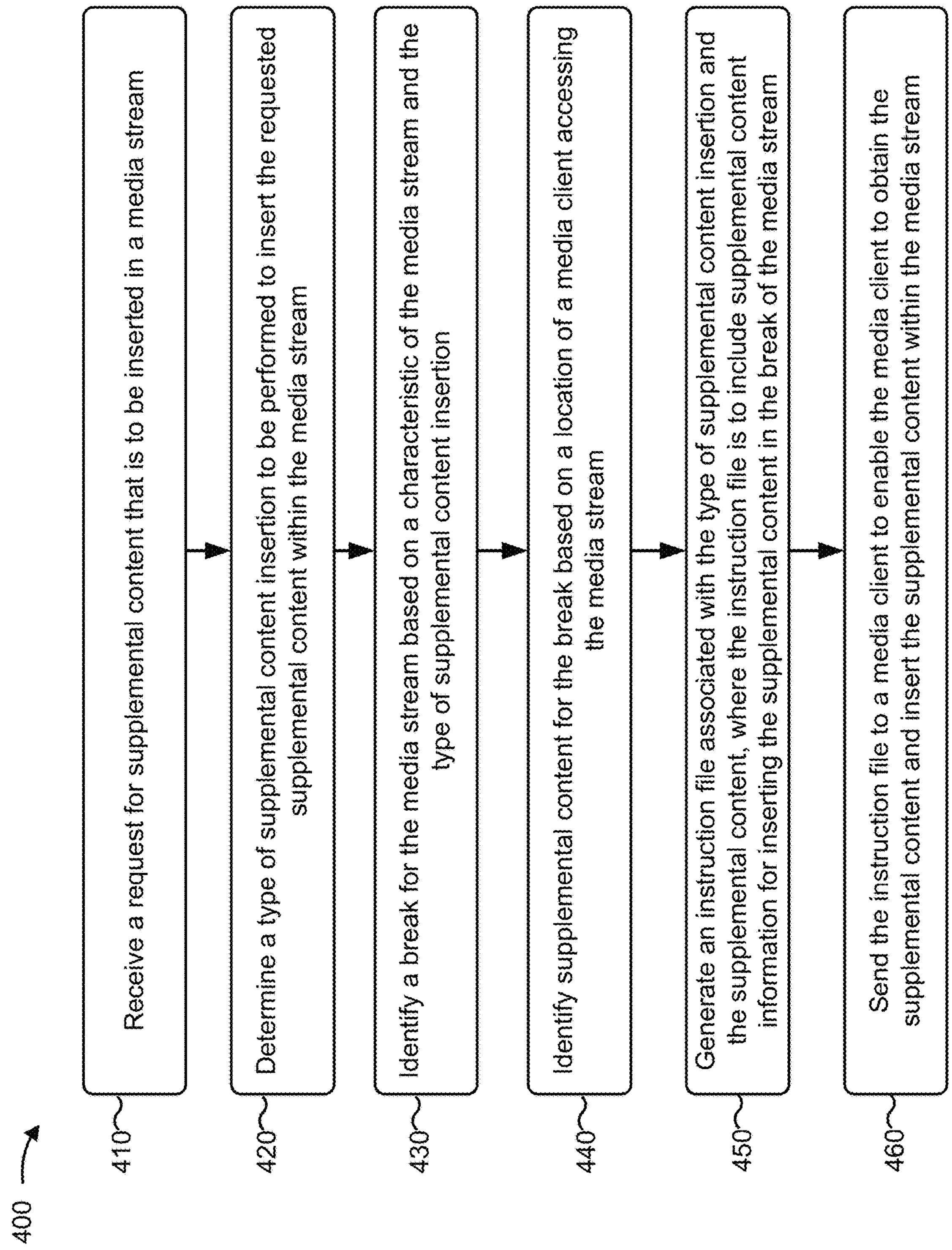
FIG. 4 is a flow chart of an example process for providing information for inserting supplemental content within a media stream.

FIG. 4 is a flow chart of an example process 400 for providing information for inserting supplemental content within a media stream. In some implementations, one or more process blocks of FIG. 4 can be performed by supplemental content server 230. In some implementations, one or more process blocks of FIG. 4 can be performed by another device or a group of devices separate from or including supplemental content server 230, such as media client 210, supplemental content source 240, and/or a CDN 250.

As shown in FIG. 4, process 400 can include receiving a request for supplemental content that is to be inserted in a media stream (block 410). For example, supplemental content server 230 can receive the request for supplemental content from media client 210. In some implementations, supplemental content server 230 can receive the request for supplemental content based on media client sending the request, based on media client 210 accessing a media stream, based on media client 210 detecting a break in the media stream, based on media client 210 performing a supplemental content pre-fetch for a media stream, and/or the like.

In some implementations, the request can include a message or notification indicating that media client 210 seeks supplemental content information (e.g., VMAP information and/or VAST information) for a break of the media stream. An example request can include a characteristic of media client 210 and/or the media stream. Such characteristics can include subscription information associated with a media service provider associated with CDN 250, an identifier of the media stream (e.g., a stream identifier, a channel number, a media network identifier, a program identifier, and/or the like), a time of the request, a time of a break detected by media client 210, a location of media client 210 (e.g., which can be based on a global positioning system (GPS), an access point of network 220, and/or the like), and/or the like.

In some implementations, a media stream can include a continuous feed (e.g., an upload or download) of data that includes content (e.g., media content accessible by media client 210). In some implementations, content can include video, audio, text, an image, and/or the like. In some implementations, the content can include live content (e.g., live video, provided in real-time or near real-time), look-up content (e.g., catch-up content, stored content, and/or the like), on demand content, and/or the like. In some implementations, content can include one or more packets. In some implementations, a packet can refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via network 220, supplemental content server 230, supplemental content source 240 and/or CDN 250. In some implementations, a portion of content can include a segment, a chunk, and/or the like.

As used herein, content can be program content or supplemental content. As used herein, program content can include content produced by a media company, a media network, a media broadcast company, and/or the like. For example, program content can include video, audio, text, an image, and/or the like for a television program, a movie, a televised sporting event, a newscast, a podcast, a niche streaming, a hosted or shared video/audio file, an event cinema, a livecast, a video game, and/or the like. Supplemental content can include metadata, display content associated with the media stream, advertising content, and/or the like. As such, supplemental content can be produced or associated with an advertisement agency, media company, media network, media broadcast company, and/or the like for the purpose of advertising a brand, a product, program content, and/or the like. For example, supplemental content can include video, audio, text, an image, and/or the like for a commercial, a preview, a banner ad, a public service announcement, an endorsement, an advertorial, and/or the like.

Supplemental content server 230 can receive the request (e.g., from media client 210) using any suitable techniques or protocols. In some implementations, supplemental content server 230 can receive the request for supplemental content via a communication link (e.g., established via network 220) with media client 210. As such, supplemental content server 230, based on receiving a communication (e.g., associated with the request) via the communication link, can respond with one or more communications (e.g., according to suitable techniques or protocols) to establish the communication link to facilitate providing supplemental content information (e.g., via an instruction file).

As described herein, supplemental content (e.g., metadata, display content associated with the media stream, advertising content, and/or the like) can be inserted into a media stream via any suitable technique for supplemental content insertion. Supplemental content insertion includes inserting supplemental content within the media stream. In some implementations, media client 210 performs the supplemental content insertion based on receiving supplemental content information (e.g., VMAP information and/or VAST information within an instruction file received from supplemental content server 230). As used herein, supplemental content insertion involved inserting supplemental content within the media stream. For example, supplemental content can be inserted within breaks of the media stream and/or between sections of program content of the media stream. In some implementations, supplemental content insertion can be performed based on a type of the media stream that is being accessed (e.g., a unicast media stream, a multicast media stream, and a look-up media stream, and/or the like). For example, for a unicast media stream and/or look-up media stream, supplemental content insertion can involve inserting obtained (e.g., downloaded during a pre-fetch, streamed based on a SCTE35 message, and/or the like) supplemental content within the media stream; for a multicast media stream, supplemental content insertion can involve switching from the media stream to a supplemental content stream during breaks of the media stream (e.g., rather than inserting the supplemental content within the media stream, itself).

In this way, supplemental content server 230 can receive a request for supplemental content to permit supplemental content server 230 to determine a type of supplemental content insertion associated with the request.

As further shown in FIG. 4, process 400 can include determining a type of supplemental content insertion to be performed to insert the requested supplemental content within the media stream (block 420). For example, supplemental content server 230 can determine the type of supplemental content insertion that is to be performed to insert the supplemental content within the media stream. In some implementations, supplemental content server 230 can determine the type of supplemental content based on receiving the request for supplemental content.

In some implementations, supplemental content server 230 can determine the type of supplemental content insertion (e.g., unicast supplemental content insertion, multicast supplemental content insertion, look-up supplemental content insertion, pre-fetch supplemental content insertion, and/or the like) based on the type of supplemental content insertion being included within the request. For example, the request can include an indicator that indicates the type of supplemental content insertion that media client 210 (and/or any other device requesting the supplemental content) can use. In such instances, supplemental content server 230 can parse the request, analyze the request, and/or identify the type of supplemental content insertion indicated within the request to determine the type of supplemental content insertion to be performed to insert the supplemental content within the media stream.

In some implementations, supplemental content server 230 can determine the type of supplemental content insertion based on a source of the request. For example, supplemental content server 230 can determine the source (or a type of source) based on a source address of the request and/or an indicator within the request. In some implementations, when supplemental content server 230 determines that the source of the request is media client 210, supplemental content server 230 can determine that a unicast supplemental content insertion, look-up supplemental content insertion, or a pre-fetch supplemental content insertion is to be performed to insert the requested supplemental content. In some implementations, when supplemental content server 230 determines that the source is a multicast repeater, supplemental content server 230 can determine that a multicast supplemental content insertion is to be performed to insert the request supplemental content.

In this way, supplemental content server 230 can determine the type of supplemental content insertion to be performed to insert the supplemental content to permit supplemental content server 230 to identify one or more breaks of the media stream.

As shown in FIG. 4, process 400 can include identifying a break of the media stream based on a characteristic of the media stream and the type of supplemental content insertion (block 430). For example, supplemental content server 230 can identify one or more breaks of the media stream. In some implementations, supplemental content server 230 can identify the break in the media stream based on receiving the request for supplemental content and/or determining the type of supplemental content insertion to be performed to insert the requested supplemental content.

As used herein, a break refers to a section of a media stream that is allocated for supplemental content. As such, supplemental content server 230 can determine supplemental content that is to be included within the identified breaks (e.g., based on the characteristic of the break). According to some implementations, depending on a length of the break, the break can include an allocation of the media stream for one or more separate sets of supplemental content. Accordingly, supplemental content of a break can include multiple sets of supplemental content.

In some implementations, supplemental content server 230 identifies the break based on a characteristic of the media stream that can be indicated in the request to determine supplemental content that is to be included in the break. The characteristic can be at least one of an identifier of the media stream (e.g., a channel number, a channel name, a media stream number, a media stream name, and/or the like), a source of the media stream, timing information associated with the media stream (e.g., timing information indicating a time at which the request was made, timing information indicating a programming slot of the media stream, and/or the like), and/or the like. According to some implementations, the characteristic can be one of a plurality of characteristics used to identify the break in the media stream. For example, supplemental content server 230 can use an identifier of the media stream and location information indicating a region where the media stream is being accessed (e.g. a location of media client 210).

In some implementations, based on the type of supplemental content insertion, supplemental content server 230 can identify which upcoming breaks of the media stream are associated with the request (i.e., for which breaks supplemental content server 230 is to provide supplemental content information). For example, for a pre-fetch supplemental content insertion, supplemental content server 230 can identify one or more breaks for a particular time period after receiving the request. In some implementations, supplemental content server 230 can identify a next upcoming break for the media stream (e.g., based on timing information associated with the media stream).

In this way, supplemental content server 230 can identify one or more upcoming breaks of the media stream to permit supplemental content server 230 to identify supplemental content for the break.

As further shown in FIG. 4, process 400 can include identifying supplemental content for the break based on a location of a media client accessing the media stream (block 440). For example, supplemental content server 230 can identify or determine the supplemental content for the break of the media stream based on a location of media client 210. In some implementations, supplemental content server 230 can identify the supplemental content based on receiving the request and/or identifying the break of the media stream.

In some implementations, supplemental content server 230 can identify supplemental content for the break based on VMAP information and/or VAST information. As used herein, the supplemental content that is to be included within a break of the media stream can be described as a supplemental content break. According to some implementations, a supplemental content break can be represented by VMAP information (e.g., rather than the actual supplemental content). For example, the supplemental content may include one or more ads that are to be inserted in the media stream. The VMAP information can include one or more tags associated with a supplemental content break (that includes one or more ads) that is to be included within the break of the media stream and/or one or more tags associated with a source of the supplemental content break (e.g., supplemental content source 240). For example, a tag of a supplemental content break can include an identifier (e.g., a name, a number, and/or the like) of the supplemental content break, a type of the supplemental content break (e.g. a linear supplemental content break, a banner supplemental content break, and/or the like), and/or timing information for the supplemental content break. According to some implementations, timing information can indicate that timing for inserting supplemental content of the break is to be exact or is to be offset from the break of the media stream. In some implementations (e.g., for pre-fetch supplemental content insertion), the timing information can indicate that the supplemental content break is one of a plurality of supplemental content breaks for a time period of the media stream, and the timing information can indicate an order in which each of the plurality of supplemental content breaks are to be inserted within corresponding breaks of the media stream.

As described herein, supplemental content of a particular supplemental content break can be represented by VAST information. For example, the supplemental content break may include one or more ads that can be included within content slots of the supplemental content break. The VAST information can include one or more tags associated with one or more ads of the supplemental content break and/or a duration of the one or more ads of the supplemental content break. For example, a tag of an supplemental content can include an identifier of the supplemental content and/or a sequence number of the tag corresponding to which content slot is to include which supplemental content within the break relative to other ads of the supplemental content break. An example duration tag indicates a length of supplemental content of the supplemental content break. According to some implementations, supplemental content server 230 can utilize the duration and/or a sequence number of supplemental content to identify available supplemental content to be included within the supplemental content break (e.g., based on location information associated with the media stream that indicates from where the media stream is being accessed).

According to some implementations, location information indicating a location of media client 210 can be included in the request. For example, the location information of the request can indicate a location from where the media stream is being accessed by media client 210. As such, the location information can indicate a location of media client 210. For example, media client 210 can be located within a local zone and a region (which can include a plurality of local zones) that indicates which supplemental content is to be included within the break. As such, the location information can indicate the local zone and/or region of media client 210. In some examples, supplemental content for a particular break or a particular content slot can be different depending on which local zone or region of media client 210. For example, if media client 210 is in a first local zone of a first region, media client 210 can insert first supplemental content in first slot of a supplemental content break, while a different media client that is in a second local zone of the first region can insert second supplemental content in the first slot of the supplemental content break. Accordingly, depending on the location information, supplemental content server 230 identifies appropriate supplemental content that is to be included within a supplemental content break for the break in the media stream.

In this way, supplemental content server 230 can identify supplemental content for the break to permit supplemental content server 230 to generate an instruction file associated with the supplemental content insertion.

As shown in FIG. 4, process 400 can include generating an instruction file associated with the type of supplemental content insertion and the supplemental content, where the instruction file is to include supplemental content information for inserting the supplemental content in the break of the media stream (block 450). For example, supplemental content server 230 can generate the instruction file to include instructions to enable media client 210 to insert the supplemental content within the media stream. In some implementations, supplemental content server 230 can generate the file based on identifying the supplemental content for the break, based on receiving the request, and/or the like.

In some implementations, the instruction file can be an XML file. Accordingly, supplemental content server 230 can generate the instruction file to include information (e.g., in text form) that indicates the transportation, structure, and/or storage of supplemental content for one or more breaks of a media stream. As such, using the instruction file, media client 210 can identify and obtain supplemental content that is to be inserted within a break of the media stream. For example, the instruction file can include VMAP information to indicate supplemental content break information and VAST information for each supplemental content break to indicate a schedule of ads (and corresponding supplemental content) to be included within the break of the media stream. Therefore, media client 210 can identify supplemental content source 240 (e.g., from VMAP information), obtain the appropriate supplemental content from supplemental content source 240 (e.g., using an identifier from the VAST information), and insert the supplemental content within the break of the media stream (e.g., using the sequence number and/or duration from the VAST information).

In this way, supplemental content server 230 can generate an instruction file that can be sent to media client 210 to enable media client 210 to insert supplemental content within a break of the media stream.

As further shown in FIG. 4, process 400 can include sending the instruction file to a media client to enable the media client to obtain the supplemental content and insert the supplemental content within the media stream (block 460). For example, supplemental content server 230 can send the instruction file to media client 210. In some implementations, supplemental content server 230 can send the instruction file based on generating the instruction file and/or receiving the request for supplemental content.

Supplemental content server 230 can send the instruction file (e.g., to media client 210) using any suitable techniques or protocols. In some implementations, supplemental content server 230 can send the instruction file via a communication link (e.g., a same communication link used to receive the request for supplemental content) with media client 210. As such, supplemental content server 230, based on receiving a communication (e.g., the request for supplemental content) via the communication link, can respond with one or more communications (e.g., according to suitable techniques or protocols) including the instruction file.

In this way, supplemental content server 230 can send an instruction file to media client 210 to enable media client 210 to insert supplemental content into a media stream using the instruction file (e.g., and including VMAP information and VAST information).

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Accordingly, as described herein, a supplemental content server 230 and/or media client 210 can utilize VMAP information and/or VAST information for supplemental content insertion. For example, rather than a supplemental content server 230 providing supplemental content to media client 210, supplemental content server 230 can provide the VMAP information and VAST information (e.g., via an instruction file) to enable media client 210 to obtain the supplemental content. As such, some implementations described herein can conserve networking resources by enabling media client 210 to obtain the supplemental content from supplemental content sources 240. For example, the supplemental content sources 240 can be located nearer media client 210 tha supplemental content server 230.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:

one or more processors configured to:

determine, based on a request from a media client, a type of supplemental content insertion to be performed to insert supplemental content into a media stream accessed by the media client, where the request includes information indicating the type of supplemental content insertion to be performed to insert the supplemental content within the media stream;

generate an instruction file associated with the type of supplemental content insertion and the supplemental content; and send the instruction file to the media client to enable the media client to access the supplemental content that is to be inserted into the media stream.

2. The device of claim 1, where the one or more processors are further configured to:

identify a break of the media stream based on the media stream and the type of supplemental content insertion; and identify the supplemental content based on the break and based on the media client, where the supplemental content is to be accessed by the media client during the break.

3. The device of claim 1, where the one or more processors, when determining the type of supplemental content insertion to be performed, are configured to at least one of:

determine the type of supplemental content insertion to be performed based on a source of the request, or determine the type of supplemental content insertion to be performed based on an indicator within the request.

4. The device of claim 3, where the one or more processors, when determining the type of supplemental content insertion to be performed based on a source of the request, are configured to:

determine the type of supplemental content insertion to be performed based on the source of the request being a multicast repeater; and determine that a multicast supplemental content insertion is to be performed, based on the source of the request being the multicast repeater.

5. The device of claim 1, where the request for supplemental content includes location information identifying a location associated with the media client; and where the one or more processors are further configured to:

identify a region of the media client in the location information; and identify the supplemental content based on the region of the media client.

6. The device of claim 1, where the type of supplemental content insertion comprises at least one of:

unicast supplemental content insertion, multicast supplemental content insertion, look-up supplemental content insertion, or pre-fetch supplemental content insertion.

7. The device of claim 1, where the instruction file includes supplemental content information for inserting the supplemental content into a break of the media stream, and where the supplemental content information includes at least one of:

video advertisement serving template information, or video multiple advertisement playlist information.

8. A non-transitory computer-readable medium storing instructions, the instructions comprising:

one or more instructions that, when executed by one or more processors, cause the one or more processors to:

determine, based on a request from a media client, a type of supplemental content insertion to be performed to insert supplemental content into a media stream accessed by the media client, where the request includes information indicating a type of supplemental content insertion to be performed to insert the supplemental content within the media stream;

generate an instruction file associated with the type of supplemental content insertion and the supplemental content; and send the instruction file to the media client to enable the media client to access the supplemental content that is to be inserted into the media stream.

9. The non-transitory computer-readable medium of claim 8, where the one or more instructions, that cause the one or more processors to identify the supplemental content, cause the one or more processors to:

identify a break of the media stream based on a characteristic of the media stream and the type of supplemental content insertion;

determine feature information identifying a feature associated with the media client; and identify the supplemental content based on the break and based on the feature associated with the media client, where the supplemental content is to be accessed by the media client during the break, based on the identified feature of the media client.

10. The non-transitory computer-readable medium of claim 9, where the one or more instructions, that cause the one or more processors to identify the supplemental content for the break, cause the one or more processors to:

identify the supplemental content for the break based in part on timing information indicating that timing for inserting supplemental content of the break is to be exact, or identify the supplemental content for the break based in part on timing information indicating that timing for inserting supplemental content of the break is to be offset from the break of the media stream.

11. The non-transitory computer-readable medium of claim 8, where the one or more instructions, that cause the one or more processors to determine the type of supplemental content insertion to be performed, cause the one or more processors to at least one of:

determine the type of supplemental content insertion to be performed based on a source of the request, or determine the type of supplemental content insertion to be performed based on an indicator within the request.

12. The non-transitory computer-readable medium of claim 11, where the one or more instructions, that cause the one or more processors to determine the type of supplemental content insertion to be performed based on a source of the request, cause the one or more processors to:

determine the type of supplemental content insertion to be performed based on the source of the request being a multicast repeater; and determine that a multicast supplemental content insertion is to be performed, based on the source of the request being the multicast repeater.

13. The non-transitory computer-readable medium of claim 8, where the one or more instructions, that cause the one or more processors to generate an instruction file associated with the type of supplemental content insertion and the supplemental content, cause the one or more processors to:

identify a break of the media stream based on a characteristic of the media stream and the type of supplemental content insertion, where the characteristic of the media stream includes at least one of:

an identifier of the media stream, a source of the media stream, or timing information of the media stream.

14. The non-transitory computer-readable medium of claim 13, where the timing information of the media stream includes at least one of:

timing information indicating a time at which the request was made, or timing information indicating a programming slot of the media stream.

15. A method, comprising:

determining, by a device, based on a request from a media client, a type of supplemental content insertion to be performed to insert supplemental content into a media stream accessed by the media client, where the request includes information indicating a type of supplemental content insertion to be performed to insert the supplemental content within the media stream;

identifying, by the device, a break of the media stream based on a characteristic of the media stream and the type of supplemental content insertion;

identifying, by the device, the supplemental content for the break based in part on the media client, where the supplemental content is to be accessed by the media client during the break;

generating, by the device, an instruction file associated with the type of supplemental content insertion and the supplemental content, where the instruction file includes supplemental content information for inserting the supplemental content in the break of the media stream; and sending, by the device, the instruction file to the media client to enable the media client to access the supplemental content that is to be inserted into the media stream.

16. The method of claim 15, further comprising, based on the type of supplemental content insertion:

identifying upcoming breaks of the media stream to be associated with the request;

identifying one or more breaks for a particular time period after the request is received; or identifying a next upcoming break of the media stream to be associated with the request.

17. The method of claim 15, where the request for supplemental content includes location information associated with the media client.

18. The method of claim 17, where identifying, by the device, the supplemental content for the break comprises:

identifying a local zone of the media client in the location information; and identifying the supplemental content based on the local zone of the media client.

19. The method of claim 15, where identifying, by the device, the supplemental content for the break, based in part on the media client, comprises at least one of:

identifying, by the device, the supplemental content for the break based in part on receiving the request; or identifying, by the device, the supplemental content for the break based in part on identifying the break of the media stream.

20. The method of claim 15, where the characteristic of the media stream includes timing information, and where the timing information:

indicates that the break of the media stream in which the supplemental content is to be included is one of a plurality of breaks for a time period of the media stream; and indicates an order in which supplemental content is to be inserted within corresponding breaks of the plurality of breaks for the time period of the media stream.

* * * * *